April 14, 1964   A. M. BARRETT, JR   3,128,840
RANDOM CONTROL FOR POWER-DRIVEN UNIT
Filed April 23, 1962   3 Sheets-Sheet 1

INVENTOR.
ARTHUR M. BARRETT JR.
BY
ATTYS.

INVENTOR.
ARTHUR M. BARRETT JR.

BY

ATTYS.

United States Patent Office
3,128,840
Patented Apr. 14, 1964

3,128,840
RANDOM CONTROL FOR POWER-DRIVEN UNIT
Arthur M. Barrett, Jr., Northbrook, Ill., assignor to Barrett Electronics Corporation, Northbrook, Ill., a corporation of Illinois
Filed Apr. 23, 1962, Ser. No. 189,642
15 Claims. (Cl. 180—77)

This invention is directed to a control system for a power-driven unit which, by effecting random motion of the unit within a preassigned boundary, accomplishes a result substantially equivalent to results formerly obtained by precisely controlling motion of the unit in a predetermined pattern or along a preassigned route.

More particularly, certain laborious tasks such as crop planting, harvesting, and even the cutting of a lawn, require the repeated passage of a power-operated vehicle or unit over the surface of a defined area, with the unit travel accurately controlled to ensure that substantially all of the surface is traversed. Because the example of lawn cutting is probably the most familiar one, the inventive principles and structure will be explained in such an environment. It is emphasized, however, that such explanation is by way of example only and in no sense by way of limitation.

Technical achievements in the past few decades have been made which tend to minimize various burdens and tasks, including the prosaic task of cutting the grass. See, for example, expired Patent No. 2,339,291—Paulus et al., in FIGURE 1 of which reference numeral 8 denotes a mower-guiding wire or conductor, buried in the ground, which as energized radiates course-defining signals for reception by a guidance system on the mower. A recently significant improvement in guidance systems adapted for such use is set forth in Patent No. 3,009,525 which issued to Robert De Liban on November 21, 1961, entitled "Guidance Systems." However, because of the cost and physical inconvenience of disturbing the landscaping to bury the guiding conductor which must extend along the exact path to be followed by the mower in each cutting operation, such arrangements have not received general acceptance at the consumer level.

That is, a conventional lawn mower has a somewhat limited width of cut, and as a result the mower must make a number of cuts (usually in adjacent and slight overlapping relation with each other) in the cutting of a lawn. Manifestly, if such manner of cutting is to be duplicated by a guidance system, a guiding conductor must be provided which extends along the path of travel of the mower over the entire area to be cut, and as indicated in FIGURE 1 of the Paulus et al. patent, even in the most efficient layouts, the resultant conductor maze which must be buried requires a severe disturbance of the turf which, in turn, tends to discourage the installation thereof.

It is therefore a primary object of the present invention to provide a control system for directing a vehicle to traverse substantially all the area within a predetermined boundary without requiring the expense and incurring the annoyance entailed in having such area dug up to have a guide conductor implanted in a detailed pattern, and then having the area re-sodded or re-surfaced.

An important object of the invention is the provision of a control system operable to guide the vehicle along a random route in such manner that substantially all of a given area is traversed.

The foregoing and other objects are realized, in one embodiment of the invention, in a system including a single loop of guide conductor laid down substantially coincident with the periphery of the area to be traversed. The mower or other propelled unit is equipped with a sensing apparatus such as that disclosed and claimed in the above-identified De Liban patent. After energizing the guide conductor to provide a course-defining signal and enabling the mower propulsion means, the sensing apparatus guides the mower along a path coincident with the boundary, following the guide wire as explained in such patent. After a complete circuit of the periphery, in accordance with the present invention, operation of the sensing apparatus is effectively reversed and the mower is guided away from the boundary on a first course, to traverse a portion of the area delineated by the guide conductor. As the mower approaches another portion of the boundary-defining guide conductor, the sensing apparatus detects such approach and provides a control signal which directs the mower to leave the first course and turn away from the boundary to traverse a second course, entirely unrelated to the first. This operation is repeated, with the mower being directed away from the guide conductor each time it nears the conductor, driving the mower along a random route within the confines of the boundary-indicating guide conductor and thus mowing the grass in such area. Being a random, rather than a precisely-controlled, operation, the time period required to cut the grass in random manner is greater than the elapsed time for driving the mower (at the same speed as in the random operation) over the same area in accordance with a regular cutting pattern. However, the additional time required is more than offset by the economic and aesthetic advantages of the single conductor loop installation around the periphery of the area to be cut, rather than requiring an extensive conductor network to be buried as was commonly taught in the art as exemplified by the expired Paulus et al. patent.

Now in order to enable those skilled in the art to make and use the invention, a specific embodiment will be described and the mode of operation will be explained in connection with the accompanying drawings, in the several figures of which like reference numerals identify like elements, and in which.

GENERAL DESCRIPTION OF THE INVENTION

Figure 1:
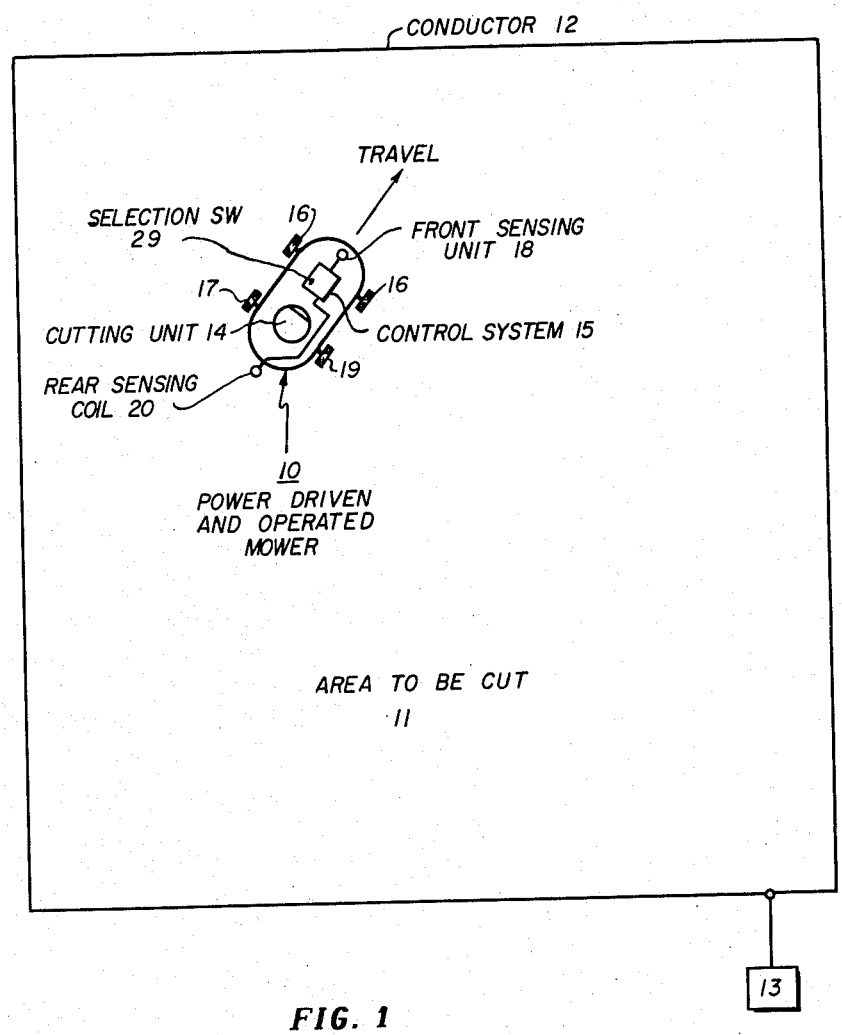
FIGURE 1 is an explanatory plan view of a vehicle disposed within an area defined by a guide conductor.

As shown in FIGURE 1, a mower 10 is positioned to be driven over an area 11 within the confines of a guide conductor 12 to which an oscillator 13, or other means for producing a suitable electro-magnetic signal, is coupled. The manner of positioning the guide conductor and of applying the signal from oscillator 13 thereto is explained in detail in the above-identified De Liban patent.

Figure 2:
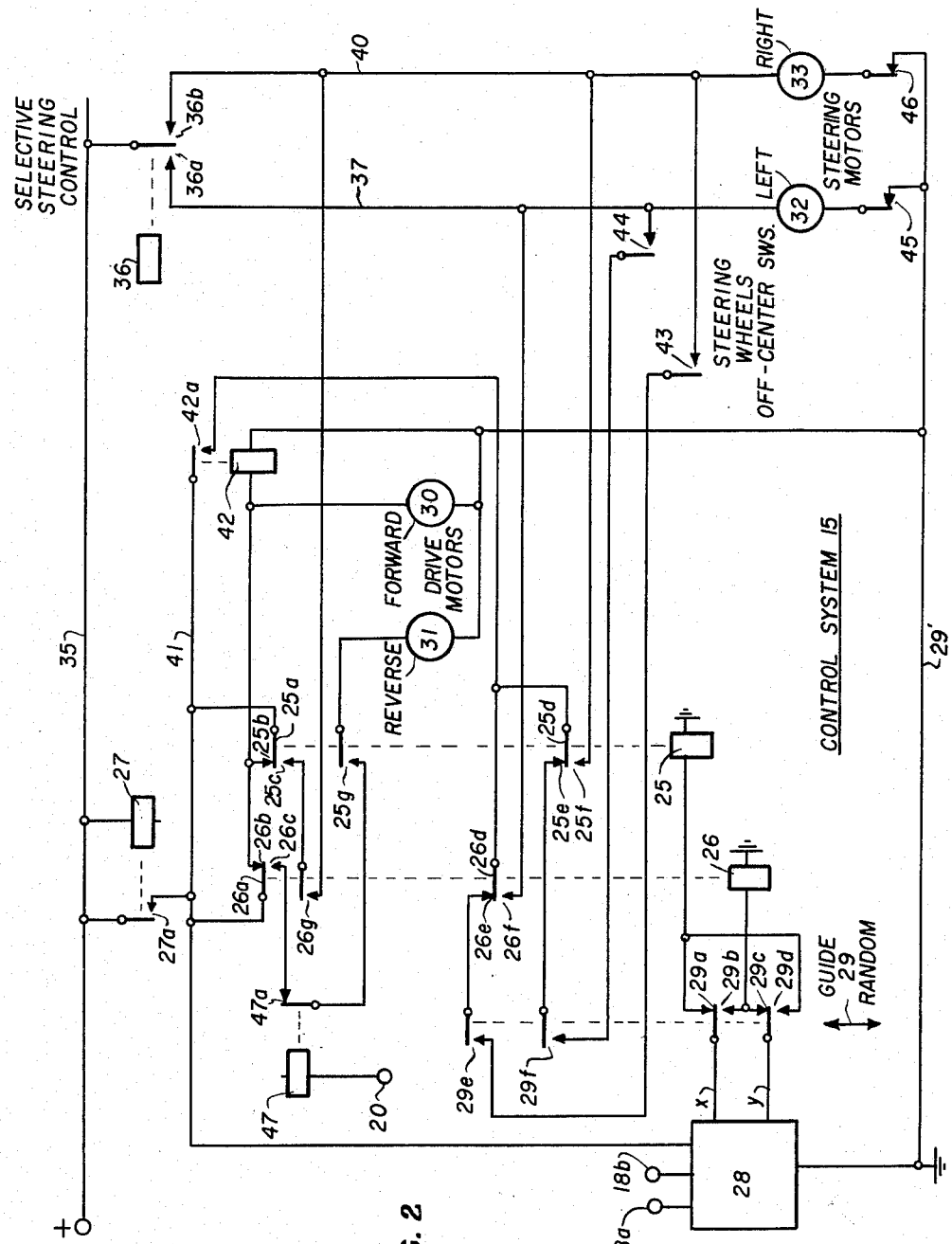
FIGURE 2 is a schematic diagram of a control system for guiding the vehicle in accordance with the inventive principles.

Mower 10 includes a cutting unit 14, a control system 15, a pair of front steering wheels 16 and a pair of rear wheels 17, a front sensing unit 18 positioned near the front of the mower and a rear sensing coil 20 positioned at the back of the mower or vehicle. Limit switches 45, 46 (FIGURE 2) are provided to prevent the steering wheels of the vehicle from being turned through too great an angle, and off-center switches 43, 44 (FIGURE 2) are also provided adjacent the steering wheels for the purpose of maintaining the mower substantially on a linear course once a path has been determined, as described more fully hereinafter. The control system of FIGURE 2 which may be mounted on mobile unit 10, as shown in FIGURE 1, includes control means 28 connected to sensing coils 18a, 18b to provide output signals which have characteristics related to the position of the mobile unit relative to the guide conductor as shown in more detail hereinafter. The output signals of the control means are coupled to two signal responsive devices 25, 26 which are in turn operative at their contacts 25a–g, 26a–g, respectively to energize and control the propulsion means of the mower, represented by a forward drive motor 30 and a reverse drive motor 31, and the steering control means including left steering motor 32 and right steering motor 33 are shown in FIGURE 2. Those skilled in the art will recognize that a single motor can be utilized as a propulsion means, being selectively energized to provide forward and reverse movement of the mower. In like manner the left and right steering motors can be combined into a single electrical unit. For purposes of the present explanation, however, it is convenient to illustrate the drive and steering means as individual elements.

A two position selection switch 29 connected to control means 28 is operable in one position (Guide Position) to connect the output signals of the control means 28 to relays 25, 26 to control the mobile unit to seek and follow a path predetermined by the conductor 12 as described in the above-identified patent. With movement of the switch 29 to a second position (Random Position) the output signals of control means 28 are coupled to relays 25, 26 in a reverse manner, whereby with movement of the mobile unit 10 sufficiently close to the conductor 12, the relays control the mobile unit to turn away from the conductor 12, the direction of turn being determined by the position of the mobile unit relative to the conductor 12.

To correlate the embodiment of the present invention as depicted in FIGURE 2 with the disclosure of the De Liban patent, reference is made to FIGURES 2, 3, 14, 15 and 16 of such patent. The specification and drawings of the reference set forth in detail a sensing unit which may comprise two or three coils arranged to detect signals radiated from a guide conductor, and further teach a control circuit (FIGURES 14, 15, etc.), which is operative with the detection of such signals to guide a mobile unit along a path defined by the guide conductor.

In the embodiment of FIGURE 14, for example, as the mobile unit is displaced to one side of the guide conductor, the control circuit couples a signal to polarized relay 82 which, as energized, effects operation of the steering motor in a first direction to return the mobile unit to the path defined by the guide conductor. In a similar manner as the unit is displaced to the other side of the cable the control circuit effects energization of relay 83 to operate the steering motor in a second direction to control the return of the mobile unit to the path defined by the guide conductor.

Such arrangement is represented in FIGURE 2 of the present application by the sensing coils 18a and 18b (which respectively correspond to the lateral displacement coil 40 and reference coil 38 of the patent); the control means 28 which corresponds to the control circuitry, such as shown in FIGURE 14 for controlling the energization of relays 82, 83 as the coils detect signals from the guide conductor, and relays 25, 26 which correspond to relays 82, 83 shown thereat.

A two position selection switch 29 has been interconnected between the output of the control means 28 and relays 25, 26, the switch being operative in one position (Guide Position) to connect the relays to effect movement of the mobile unit along the path defined by the guided conductors in the manner taught in the patent, and being operative in a second position (Random Position) to connect the relays 25, 26 to continually effect movement away from the guide conductors.

It is noted that the system contemplates the use of two coils in the random application (i.e., lateral displacement coil 40 and reference coil 38). If an angle measuring coil, such as coil 39 shown in the above identified De Liban patent, is included to provide the improved guidance control of the type set forth in such patent, switch 29 will include an additional contact set which is operable to disable such coil in use of the device in the random operation.

It is assumed for exemplary purposes in the present arrangement that with the switch 29 in the "Guide Position" (wherein the mobile unit follows the guide conductor 12), contacts 29a and 29c are closed (as shown in FIGURE 2) and as a signal is detected by coils 18a and 18b on the vehicle indicating that the mobile unit is to the right of the guide conductor 12 and that the vehicle should therefore turn left, a signal is impressed over conductor Y to relay 26, and as shown hereinafter, in more detail, relay 26 operates to control the vehicle to turn left in the direction of the path. In a similar manner when the sensing unit 18 determines that the mobile unit is to the left of the guide conductor, control means 28 impresses a signal over conductor X to relay 25 which operates to control the unit to turn right in the direction of the path.

With the switch 29 in the "Random Position", contacts 29b and 29d are closed, and a correspondingly different operation is obtained. That is, as the sensing unit 18 determines that the unit is to the right of a conductor, the sensing coils and control means 28 provide a signal over conductor Y in the same manner as before. However, with the switch 29 in the "Random Position", the signal is now coupled to relay 25 and the steering unit will turn right (away from instead of toward the guided conductor). In a similar manner if the sensing coils determine that the mobile unit is to the left of the conductor, the sensing unit 18 and control circuit 28 provides a signal over conductor X as before. However, with the switch 29 in the "Random Position" the signal is now coupled to relay 26 and the steering unit will turn left away from the guided conductor (instead of toward the guided conductor).

Circuit means are provided to operate responsive to the head-on or perpendicular approach of the mower toward the guide conductor, to both de-energize the forward drive motor and energize the reverse drive motor, and at the same time energize one of the steering motors to back the mower away from the boundary and provide a different orientation of the vehicle with respect to the guide wire. Thus as the mower is again energized to proceed in a forward direction, its orientation has been altered and it will be turned away from the guide conductor 12. As a safety feature, if the mower should somehow be backed directly along a line normal to the guide conductor, fail-safe means are provided to halt the mower as the rear sensing coil 20 approaches the guide conductor 12. With this perspective of the inventive system and its relation to the De Liban disclosure, the present invention, and particularly the detailed showing of FIGURE 2, will be more readily understood.

DETAILED DESCRIPTION OF INVENTION

In more detail, as shown in FIGURE 2, the control system 15 of the invention includes a common supply conductor 35 connected to the positive terminal of a source of potential and contact means for selectively connecting the common supply conductor to the forward and reverse drive motors 30 and 31 and to the left and right steering motors 32 and 33. A start switch 27 (which may be a hand toggle switch, a remotely controlled relay or similar type switching device), includes a contact set 27a which is operative to complete an energizing circuit for forward drive motor 30, the circuit extending from supply conductor 35 over contacts 27a, 25a, 25b of the "turn right" relay 25 (and also over parallel-connected contact set 26a, 26b of the "turn left" relay) and the forward drive motor 30 to ground. Absent any other control operation, switch means 27 therefore completes an energizing circuit for the forward drive motor 30 to propel the mower forward from its at-rest position.

The winding of a relay 42 is parallel-coupled with forward motor 30, so that as motor 30 is energized, relay 42 is also energized to close its contact set 42a and extend the potential from conductors 35 over contacts 27a, conductor 41 and contact set 42a to a bank of contacts controlled by the "turn right" and "turn left" relays 25, 26. If the position control switch 29 is in the random position, and sensing unit 18 is sufficiently removed from the influence of the guide conductor 12, the contacts will be in the position illustrated in FIGURE 2 and the potential is further extended to the off-center switches 43 and 44 for the steering wheels 16. Whenever the steering wheels are in line, off-center switches 43 and 44 remain in the open condition, as illustrated, and the vehicle proceeds along a straight course. As shown more fully hereinafter during random operations, with drift of the steering vehicle from a course one of the off-center switches 43, 44 (depending upon the direction of drift) is operative to actuate the proper steering motor to correct the deivation.

The steering motor circuits further extend over left and right limit switches 45 and 46 and conductor 29 to ground, the limit switches being operative to interrupt the energizing circuit for a steering motor as the steering wheels are rotated to a predetermined angular displacement beyond a preset desired turning radius.

As indicated above (and described more fully hereinafter) energization of the left steering motor 32 and right steering motor 33 is selectively controlled by the relays 25, 26 which are in turn controlled by the sensing unit 18 and control circuit 28. As shown hereinafter, with the switch 29 in the guide position, the sensing unit 18 and control circuit 28 operate relays 25, 26 and their contacts 25d–25f, 26d–26f to control the steering motors 32, 33 in the manipulation of the mobile unit along the path defined by the guide conductor 12. With switch 29 in the random position and movement of the mobile unit sufficiently close to a segment of guide conductor 12 for sensing unit 18 to detect a radiated signal, the proper one of the relays 25 and 26 is operated to energize the left or right steering motor 32 or 33 and thereby turn the mobile unit away from the segment of the guide conductor 12 which is adjacent thereto.

In the event that the mobile unit in its random operation approaches a segment of guide conductor along a substantially perpendicular path, both relays 25 and 26 will be operated, and a circuit will be completed to the reverse motor 31 and simultaneously to the right steering motor 33.

Rear sensing coil 20 is shown connected to the winding of a relay 47 which includes a normally-closed contact set 47a, connected in the energizing circuit for reverse drive motor 31. As noted above, if both relays 25 and 26 are actuated simultaneously, and relay 47 is non-energized, an energizing circuit is completed for reverse drive motor 31. However, if as the mower backs up, the rear sensing coil 20 approaches a segment of the guide conductor, the signal thus detected is effective to operate relay 47 and open contact set 47a to interrupt the energizing circuit for reverse drive motor 31, thus halting the vehicle.

OPERATION OF THE INVENTION

With the foregoing description of an embodiment of the invention, the mode of operation thereof will now be explained in connection with FIGURES 3A–3D. For convenience in referring to different sections of the guide conductor 12, the several sides of the rectangle delineated by the conductor have been referenced as 12a, 12b, 12c and 12d. As the operation is explained, it will become apparent that the invention is not limited to a guide conductor laid down in any particular configuration, but works equally well if the enclosure is defined by any regular or irregular figure, or by any substantially closed boundary line.

(a) *Guided Operation*

The switch 29 is first moved to the guide position to close contacts 29a, c and open contacts 29b, d, e, f, the guide conductor 12 is energized and start switch 27 is closed. With the closure of start switch 27, an energizing circuit is completed for the forward drive motor 30 which extends from positive terminal on the potential source carried by the mobile unit over contacts 27a, 25a, 25b (or the parallel circuit comprised of contacts 26a, 26b), forward drive motor 30, and also over parallel connected relay 42, and conductor 29' to ground. The forward drive motor 30 operates to propel the mower in a forward direction. Simultaneously relay 42 operates and at its contacts 42a prepares the control circuits for the left steering motor 32 and the right steering motor 33. In the event that the mower is moving along the path determined by the guide conductor 12, relays 25, 26 will be inoperative and movement of the mower will continue along such path.

Assuming now that the mobile unit tends to move to the left of the path, the sensing unit 18 and control circuit 28 will operate in the manner of the teaching of the above identified patent, to couple an energizing signal over conductor X and contacts 29a of switch 29 to relay 25. As relay 25 operates, it is effective at its contacts 25a, 25b to interrupt a portion of the energizing circuit for the forward drive motor 30 (which remains energized over the parallel path including contacts 26a, 26b); at its contacts 25a, 25c prepares a circuit which is presently ineffective by reason of the open condition of contacts 25g; and at its contacts 25d, 25f completes an energizing circuit to the right turn steering motor 33 to energize same, and control the steering mechanism of the mower to turn in the direction of the guide conductor 12. When the mower has returned to the path determined by the guide conductor 12, the signal output of the sensing unit 18 and control circuit 28 decreases sufficiently to release relay 25, and the mower proceeds along the path defined by the guide conductor 12.

In a similar manner in the event that the mobile unit is displaced to the right of the path, sensing unit 18 and control circuit 28 couple an energizing signal over conductor Y and contacts 29c to relay 26. As relay 26 operates, it is effective at its contacts 26d, 26f to complete an operating circuit to the left steering motor 32 to bring the mobile unit back to the desired path. The mower unit is thus propelled along the periphery of area 11, the sensing unit detecting the signals monitored from guide wire 12 and controlling the steering motors 32, 33 in the guidance of the mobile unit along such course.

As taught in the above identified patent, the control circuit may include means for adjusting the mobile unit the follow a path which is located immediately above the guide wire on a path which is displaced laterally from the guide wire. It is apparent therefore that if desired the mower unit may be readily adjusted to make successive trips around the periphery as guided by the wire, and by simple adjustment of the control system 28 to provide a correspondingly wider peripheral cut prior to use of the device in the random cut.

A selective steering control means 36 is shown as a manually operable switch having contacts sets 36a 36b connected to selectively energize left or right steering motors from common conductor 35 in an obvious manner. Control means 27 and 36 may also comprise means for receiving and detecting a radio signal to provide a control operation, or any other well known means to effect a selective control operation. Thus, the operation at any time may exercise independent control of the unit by operating steering control 36 either manually or by remote control means.

(b) *Random Operation*

At such time as the random cut is to be performed the switch 29 is moved to the "Random Position" to open contacts 29a, c and close contacts 29b, d, e, f.

Figure 3A:
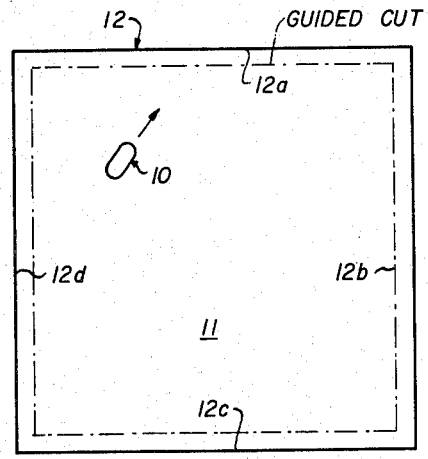
FIGURES 3A—3D are illustrative diagrams representing vehicle travel as controlled by the system depicted in FIGURE 2.

Assuming mower 10 positioned as shown in FIGURE 3A as start means 27 is now actuated to effect the closure of contact set 27a, the previously described energizing circuit for forward drive motor 30 and relay 42 are completed, and the forward drive motor 30 rotates to drive the mower in the direction indicated by the arrow in FIGURE 3A. Simultaneously control relay 42 operates and at its contacts 42a extends positive operating potential to the circuit controlled by contacts of the "turn left" and "turn right" control relays 25, 26, as well as the contacts 43, 44 of the off-center steering switches. Accordingly mower 10 is driven in the direction indicated by the arrow in FIGURE 3A, to approach segment 12a of guide conductor 12.

As the vehicle reaches point A (FIGURE 3B) a signal is picked up by the sensing unit 18 and transmitted to control means 28 of FIGURE 2. Since segment 12a is toward the left side of the mower, sensing unit 18 and control circuit 28 provide an energizing circuit over conductor Y and contacts 29a to relay 25.

Relay 25 operates and at its contacts 25a, 25b opens a portion of the energizing circuit for forward drive motor 30, which circuit is nevertheless maintained completed over contacts 26a, 26b of control relay 26; at its contacts 25a, 25c completes a portion of an energizing circuit for right steering motor 33, which circuit is interrupted at contacts 26g; at its contacts 25d, 25f completes an obvious energizing circuit for right steering motor 33 which displaces the steering wheels of mower 10 to turn the vehicle to the right as forward motor 30 continues to propel the mower forward; and at its contacts 25g completes a portion of an energizing circuit for reverse drive motor 31, which is ineffective at such time because the reverse energizing circuit is interrupted at contacts 26a, 26c of control relay 26. Accordingly, right steering motor 33 is energized to displace the steering wheels to the right causing the mower to turn in an arc as indicated between points A and B in FIGURE 3B. As the mower turns and moves away from the guide wire 12, the level of the signal received in coil 18 diminishes, and control means 28 effects the release of control relay 25.

Figure 3B:
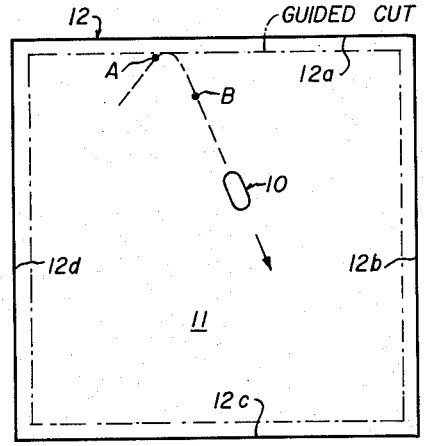
Figure 3C:
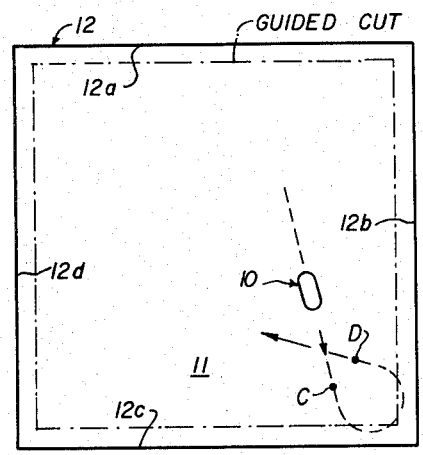

As the steering wheels were rotated to direct mower 10 to traverse arc AB in FIGURE 3B, the steering wheels were turned off-center to the right and contacts 44 thus closed. However, such contact closure is ineffective initially by reason of the open condition of contacts 25d, 25e for the period that relay 25 remains energized by the signal detected by sensing unit 18. As the mower reaches point B and the guidance control signal diminishes to effect the release of relay 25, contacts 25d, 25e are closed, and an energizing circuit is completed for the left steering motor 32 which circuit extends from the positive terminal of potential source over contacts 27a, conductor 41, contacts 42a, 25d, 25e, 29f and 44 to left steering motor 32. Accordingly, the left steering motor is energized to return the steering wheels to the centered position, which is signalled by opening of contacts 44 as the wheels reach a position in which the axis of the wheels is substantially perpendicular to the longitudinal axis of the vehicle 10. The vehicle 10 is now directed along a substantially straight line toward segment 12c of the boundary-defining guide conductor, and continues along this path until it reaches a point sufficiently close to segment 12c so that sensing unit 18 can again pick up a signal for transmission to control means 28.

As the mower nears the opposite segment 12c of the peripheral guide conductor at point C (FIGURE 3C) the signal detected by sensing unit 18 is of a sufficient level to actuate control means 28. It is noted that the orientation of the mower with respect to the segment 12c at this time is such that guide conductor 12c is closer to the right side of the mower, and therefore the signal sensed by sensing unit 18 is of a value to operate control means 28 to effect energization of relay 26 to effect a "turn left" command.

Relay 26 operates and at its contacts 26, 26b interrupts a portion of the drive circuit for forward motor 30, which is maintained energized over contacts 25a, 25b of control relay 25; at its contacts 26a, 26c completes a portion of an energizing circuit for reverse drive motor 31, which circuit is interrupted at contacts 25g of control relay 25; at its contacts 26d, 26f completes an obvious energizing circuit for the left steering motor 32; and at its contacts 26g completes a portion of an energizing circuit for right steering motor 33, which circuit is maintained interrupted at contacts 25a, 25c of the control relay 25.

After the mower has traversed substantially one-half the arcuate path CD, sensing units 18 picks up the signal from conductor segment 12b of the peripheral guide conductor, thus continuing the control operations which propel the mower through the remainder of this arc to point D. As the mower in its turn moves away from the conductor segment 12b the signal sensed by unit 18 diminishes and control relay 26 releases and the steering wheels are again centered to drive the truck along the indicated path toward a guide conductor segment 12d. That is, steering wheels of the mower were displaced at point C, contact set 43 was closed, but such closure was ineffective at the time in that contact set 26d, 26e was interrupted by operation of relay 26. However, as the mower reaches point D and the signal received by front sensing coil 18 diminishes sufficiently to effect the release of relay 26, contact sets 26d, 26e close to complete, in conjunction with contact set 43, an energizing circuit for the right steering motor 33 which is effective to return the steering wheels to the on-center position and thus maintain the vehicle on a substantially straight course.

From the foregoing description, it is evident that the mower or vehicle is always directed away from a conductor segment on a course nearly, but not quite, perpendicular to a conductor segment. Thus the control system is always operative to turn the mower away from the guide conductor segment which is being approached. In the unlikely event that the mower should approach some portion of the guide conductor on a perpendicular or head-on course, means are provided to halt the vehicle or change its course. Such arrangement will now be described.

Figure 3D:
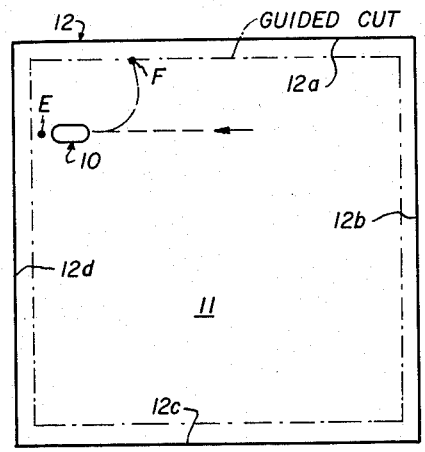

As shown in FIGURE 3D, if the vehicle approaches a segment such as 12d on a perpendicular course, it will reach a point such as point E where the signal coupled from sensing unit 18 to control means 28 is such that there is no difference between the "turn left" and "turn right" portions of the signal, thereby effecting the operation of both control relays 25 and 26 to effect three separate control functions.

The first function thus effected with operation of relays 25 and 26 is the simultaneous opening of contact set 25a, 25b and contact set 26a, 26b to de-energize forward drive motor 30. The second function thus accomplished is the energization of reverse drive motor 31 over a circuit including contact set 26a, 26c of relay 26, contact 47a of rear sensing coil 47 and contact set 25g of relay 25. Accordingly the reverse drive motor is energized and the vehicle commences to back away from segment 12d. The third control function accomplished is the energization of right steering motor 33 over a circuit extending from positive potential over contacts 27a, 25a, 25c, 26g, and conductor 40 to "right turn" motor 33 and limit switch 46 to ground. Accordingly even as the mower is being backed away from guide conductor segment 12d, the right steering motor 33 operates to alter orientation of the mower relative to the guide conductor so that, upon subsequent energization of forward drive motor 30, the signal picked up by sensing unit 18 to actuate control means 28 will be such as to operate one or the other of control relays 25 and 26, but not both of these relays.

As the mower begins to back (as indicated by the dash-dot line) toward point F in FIGURE 3D, the right side of the mower will be nearer guide conductor segment 12d, to effect the continued operation of relay 26 and the release of control relay 25. With release of relay 25, contacts 25g open to interrupt the energizing circuit for reverse drive motor, contacts 25a, c open to interrupt the circuit for "right turn" motor 33, and contacts 25a, 25b close to again complete the energizing circuit for forward drive motor 30. Relay 42 at contacts 42a and relay 26 at contacts 26f, 26d, complete the energizing circuit for effecting forward motion, left turn until such time as the sensing coil moves away from the influence of the coil segment 12d and a new path is set as described above.

It is only necessary that the mower back through a short incremental distance from the segment to provide sufficient unbalance in the sensing unit 18 to effect operation of only one of the control relays 25 and 26. Thus, it is most unlikely that the truck could ever be backed sufficiently to approach another guide conductor segment, and attempt to back out of area 11. Should such event occur, however, rear sensing coil 20 detects the approach of the unit toward the adjacent conductor segment and effects the operation of relay 47, opening contact set 47a and interrupting the energization circuit for reverse drive motor 31. If the energization circuit for the forward drive motor is also interrupted at this time by reason of the perpendicular alignment of the mower with respect to the guide conductor, then selective steering control means 36 can be actuated to selectively energize one of the steering motors and provide an orientation of the mower off such perpendicular heading, thereby to complete the circuit for forward drive motor 30 and again put the mower in automatic operation within area 11.

SUMMARY

It is thus evident that the invention provides significant and substantial economic advantages over prior art methods of driving a power-operated vehicle within a predetermined area, in a manner to traverse substantially all of such area. The invention is not limited to a guidance system in which the boundary is defined by an electrically-energized conductor, but it is apparent that other boundary-defining means, such as radioactive substances, light sources, etc., can also be used, with the concomitant provision of detection means on the power-driven unit to sense the approach to such boundary-defining means. Further, if there is some natural obstruction such as a small creek or a large tree, the peripheral boundary means need not completely enclose the area to be traversed by the vehicle, in that the radiated energy, whether electromagnetic, optical, radioactive, or other type, will be transmitted across such a gap to effectively define the boundary or enclosure even when the physical encirclement of the area to be traversed is not complete.

Of prime importance is the provision of the random control of the unit within such area, thereby obviating the necessity of completely digging up the area and burying a conductor maze thereunder, after which the surface of the area must be replaced. This significant advance has been made possible by providing random control for the unit within an area delineated by a single guide conductor producing a signal which can initially be utilized to drive the power-operated vehicle around the periphery of the area and subsequently responsive to a simple switching operation in the sensing unit of the vehicle to repel the vehicle from the conductor within the area defined by the guide conductor. In addition to the appreciable and obvious economies afforded by the invention, it is also frequently of aesthetic importance to provide such a control system for a unit which avoids the necessity of digging or tearing up any surface upon which considerable landscaping or other similar work has been done.

Although only a preferred embodiment of the invention has been described, it is obvious that modifications and alterations may be made therein, and it is intended in the appended claims to cover all such modifications and alterations as may fall within the true spirit and scope of the invention.

What is claimed is:

1. For use in a guidance system in which a signal-radiating boundary-defining means substantially encloses an area to be traversed by a mobile unit having both propulsion means and steering means, the combination of control means on said mobile unit including sensing means for providing output signals from the signals radiated by said boundary-defining means having characteristics which vary with the position of the unit relative to the boundary-defining means, and signal responsive means including steering control means operatively controlled to adjust the position of said steering means, and switching means having a first position for coupling the generated steering signals to said signal responsive means to control same to maintain said unit on a course defined by said boundary-defining means, and a second position for coupling said generated steering signals to said signal responsive means to control same to turn said unit to a course directed away from said boundary defining means responsive to detection of a signal therefrom by said sensing means.

2. For use in a guidance system in which a signal-radiating boundary-defining means substantially encloses an area to be traversed by a mobile unit having both propulsion means and steering means, the combination of control means on said mobile unit including sensing means for deriving a signal from the signal radiated by said boundary-defining means with movement of the mobile unit adjacent to a portion thereof, and signal responsive means including switching means connected to said control means operative responsive to sensing of a signal by said sensing means, and means responsive to operation of said switching means to control said steering means to turn said unit to a course directed away from the portion of the boundary-defining means from which said signal is derived by said sensing means.

3. A system as set forth in claim 2 in which said sensing means provides a predetermined signal responsive to operation of said mobile unit to a predetermined position in said area, and in which said propulsion means are operative in a forward and reverse direction, a start switch, means operative with closure of said start switch to complete a circuit to operate said propulsion means in a forward direction, and means controlled by operation of said signal responsive means in response to said predetermined signal to interrupt said forward propulsion and simultaneously initiate reverse propulsion.

4. For use in a guidance system in which a signal-radiating boundary-defining means substantially encloses an area to be traversed by a mobile unit having both steering means and propulsion means operable in a forward and a reverse direction, the combination of control means on said mobile unit including sensing means for deriving signals from the signals radiated by said boundary-defining means with movement of the mobile unit adjacent a portion thereof, and signal responsive means connected to said control means, including means controlled by said sensing means to, at times, effect a predetermined switching operation, reverse means for operating said propulsion means in the reverse direction to back said unit and means in said signal responsive means for completing a circuit to said reversing means in response to said predetermined switching operation.

5. For use in a guidance system in which a signal-radiating boundary-defining means substantially encloses an area to be traversed by a mobile unit having both propulsion means and steering means, the combination of a control means on said mobile unit including sensing means for deriving signals from the signals radiated by said boundary-defining means with movement of the mobile unit adjacent to a portion thereof, and signal responsive means connected to said control means including a first means controlled by said signal responsive means to operate said propulsion means to back away from the portion of the boundary-defining means from which a signal is derived by said sensing means, and a second means simultaneously controlled by said signal responsive means to turn in one direction during the reverse propulsion of said mobile unit.

6. For use in a guidance system in which a signal-radiating boundary-defining means substantially encloses an area to be traversed by a mobile unit having propulsion means operable in a forward and a reverse direction and steering means, the combination of control means on said mobile unit including sensing means for deriving a signal from the signal radiated by said boundary-defining means with movement of the mobile unit adjacent to a position thereof, signal responsive means including means for controlling said steering means to turn said unit to a course directed away from the portion of the boundary-defining means from which the radiated signal is detected by said energizing means, and additional sensing means operable to disable said propulsion means responsive to movement of the mobile unit in reverse adjacent to said boundary-defining means.

7. For use in a guidance system in which a signal-radiating boundary-defining means substantially encloses an area to be traversed by a mobile unit having both propulsion means and steering means, the combination of control means on said mobile unit including sensing means for deriving a signal from the signal radiated by said boundary-defining means with movement of the mobile unit adjacent to a portion thereof, signal responsive means connected to said control means including means for controlling said steering means to turn said unit to a course directed away from the portion of the boundary-defining means from which the radiated signal is detected by said sensing means, and means operable responsive to movement of the sensing means on the mobile unit away from the influence of the boundary-defining means to adjust the axis of the wheels substantially perpendicular to the longitudinal axis of the unit.

8. For use in a guidance system in which a signal-radiating boundary-defining means substantially encloses an area to be traversed by a mobile unit having both propulsion means and steering means, and control means for providing signals which indicate the position of the boundary-defining means relative to the mobile unit, the combination of signal responsive means including a first means connected to said control means operative in response to receipt of a signal indicating said boundary means are at a first relative position to control said steering means to turn said unit in a first direction to a course directed away from the portion of the boundary-defining means from which the radiated signal is detected by said sensing means, and a second means connected to said control means operative in response to receipt of a signal indicating said boundary means are at a second relative position to control said steering means to turn said mobile unit away from said boundary-defining means in a direction opposite to said first direction.

9. A system as set forth in claim 8 which includes adjustment means for automatically adjusting said steering means to maintain a straight course, and means controlled by said first and second means to energize said adjustment means responsive to a turning movement of said unit to move said sensing means out of the influence of said boundary-defining means.

10. An arrangement as set forth in claim 8 which further includes means operatively controlled responsive to simultaneous operation of said first and second means to energize said propulsion means in a reverse direction.

11. An arrangement as set forth in claim 8 which includes means controlled by simultaneous operation of said first and second means to energize said steering means to turn in one direction.

12. For use in a guidance system in which a signal-radiating boundary-defining means substantially encloses an area to be traversed by a mobile unit having both propulsion means operable in a forward and reverse direction and steering means and means including sensing means for sensing signals from said boundary-defining means, and control means for providing a signal over a first path to indicate the boundary-defining means is to one side of the mobile unit, and a signal over a second path to indicate the boundary-defining means is to the other side, signal responsive means including a first means connected to said one path operative, as energized, to control said steering means to turn said unit in a first direction to a course directed away from the boundary-defining means, and a second means connected to said second path operative as energized to control said steering means to turn said mobile unit away from said boundary-defining means in a direction opposite to said first direction.

13. For use in a guidance system in which a signal-radiating boundary-defining means substantially encloses an area to be traversed by a mobile unit having both propulsion means operable in a forward and reverse direction and steering means, and means including sensing means for sensing signals from said path, and control means for providing a signal over a first path to indicate the boundary-defining means is to one side of the mobile unit, and a signal over a second path to indicate the boundary-defining means is to the other side, signal responsive means including a first means connected to said one path operative, as energized, to control said steering means to turn said unit in a first direction to a course directed away from the boundary-defining means and a second means connected to said second path operative as energized to control said steering means to turn said mobile unit away from said boundary-defining means in a direction opposite to said first direction, and steering centering means operatively controlled by said first and second means subsequent to a turn and movement of the unit from the influence of said boundary-defining means to adjust said wheels to follow a straight course.

14. For use in a guidance system in which a signal-radiating boundary-defining means substantially encloses an area to be traversed by a mobile unit having both propulsion means for sensing signals radiated by said boundary-defining means, and control means for providing signals over a first path to indicate the boundary-defining means is to one side of the mobile unit and over a second path to indicate the boundary-defining means is to the other side, signal responsive means including a first means operative to control said steering means to turn said unit in a first direction and a second means operative to control said steering means to turn said mobile unit in a direction opposite to said first direction, and switch means having a first position for connecting said first path to said first means and said second path to said second means, and a second position for connecting said first path to said second means and said second path to said first means.

15. A method for traversing an area defined by a signal radiating boundary-defining means in a random pattern with a mobile unit having propulsion means and signal responsive steering means comprising the steps of energizing the propulsion means of said mobile unit to move in the direction of a portion of said boundary-defining means, sensing the signals radiated by said boundary-defining means responsive to movement of the mobile unit adjacent to a position thereof, and controlling said signal responsive steering means with said sensed signals to turn the mobile unit away from said boundary-defining means and out of the influence of the signals radiated thereby.

References Cited in the file of this patent

UNITED STATES PATENTS

| | | |
|---|---|---|
| 2,789,649 | Setzer | Apr. 23, 1957 |
| 2,847,080 | Zworykin et al. | Aug. 12, 1958 |
| 3,009,525 | De Liban | Nov. 21, 1961 |
| 3,039,554 | Hosking et al. | June 19, 1962 |

Notice of Adverse Decision in Interference

In Interference No. 96,202 involving Patent No. 3,128,840, A. M. Barrett, Jr., Random control for power-driven unit, final judgment adverse to the patentee was rendered Jan. 7, 1969, as to claim 15.

[*Official Gazette March 11, 1969.*]

Disclaimer 3,128,840.—*Arthur M. Barrett, Jr.*, Northbrook, Ill. RANDOM CONTROL FOR POWER-DRIVEN UNIT. Patent dated Apr. 14, 1964. Disclaimer filed by the inventor; the assignee, *Barrett Electronics Corporation*, consenting.

Hereby enter this disclaimer to claim 15 of said patent.

[*Official Gazette April 29, 1969.*]